US012778201B2

(12) United States Patent
Courbat et al.

(10) Patent No.: US 12,778,201 B2
(45) Date of Patent: Nov. 3, 2026

(54) LIQUID-CONVEYING SUSCEPTOR ASSEMBLY FOR CONVEYING AND INDUCTIVELY HEATING AN AEROSOL-FORMING LIQUID

(71) Applicant: Philip Morris Products S.A., Neuchatel (CH)

(72) Inventors: Jerome Christian Courbat, Cortaillod (CH); Oleg Mironov, Cudrefin (CH); Özgür Özsun, Kilchberg (CH)

(73) Assignee: Philip Morris Products S.A., Neuchatel (CH)

( * ) Notice: Subject to any disclaimer, the term of this patent is extended or adjusted under 35 U.S.C. 154(b) by 750 days.

(21) Appl. No.: 17/998,175

(22) PCT Filed: May 12, 2021

(86) PCT No.: PCT/EP2021/062572
§ 371 (c)(1),
(2) Date: Nov. 8, 2022

(87) PCT Pub. No.: WO2021/228914
PCT Pub. Date: Nov. 18, 2021

(65) Prior Publication Data

US 2023/0225412 A1 Jul. 20, 2023

(30) Foreign Application Priority Data

May 15, 2020 (EP) .................................... 20175054

(51) Int. Cl.
*A61M 15/06* (2006.01)
*A24F 40/10* (2020.01)
(Continued)

(52) U.S. Cl.
CPC ............ *A24F 40/465* (2020.01); *A24F 40/10* (2020.01); *A24F 40/42* (2020.01); *A24F 40/44* (2020.01); *A24F 40/57* (2020.01); *H05B 6/108* (2013.01)

(58) Field of Classification Search
None
See application file for complete search history.

(56) References Cited

U.S. PATENT DOCUMENTS

2015/0245669 A1* 9/2015 Cadieux .................. A24F 40/42 131/329
2016/0120221 A1 5/2016 Mironov et al.
(Continued)

FOREIGN PATENT DOCUMENTS

CA 2 901 396 A1 8/2014
CN 108291851 A 7/2018
(Continued)

OTHER PUBLICATIONS

Combined Russian Office Action and Search Report issued Aug. 16, 2024 in Russian Patent Application No. 2022132252/03 (with unedited computer-generated English Translation), 9 pages.
(Continued)

*Primary Examiner* — Philip Y Louie
*Assistant Examiner* — Vu P Pham
(74) *Attorney, Agent, or Firm* — Oblon, McClelland, Maier & Neustadt, L.L.P.

(57) ABSTRACT

A liquid-conveying susceptor assembly is provided for conveying and inductively heating an aerosol-forming liquid under an influence of an alternating magnetic field, the assembly including: an array of inductively heatable longitudinal filaments arranged side by side; and an array of transverse filaments arranged side by side and crossing the longitudinal filaments transverse to a length extension of the
(Continued)

longitudinal filaments, in which the transverse filaments only extend along a length portion of the longitudinal filaments such that the assembly further includes at least one grid portion and at least one non-grid portion, in which in the grid portion the transverse filaments and the longitudinal filaments cross each other, in which in the non-grid portion the assembly only includes the longitudinal filaments, but no transverse filaments, and in which length dimension of the non-grid portion is at least 20 percent of a length dimension of the longitudinal filaments.

20 Claims, 4 Drawing Sheets

(51) Int. Cl.

| | |
|---|---|
| ***A24F 40/42*** | (2020.01) |
| ***A24F 40/44*** | (2020.01) |
| ***A24F 40/465*** | (2020.01) |
| ***A24F 40/57*** | (2020.01) |
| ***H05B 6/10*** | (2006.01) |

(56) References Cited

U.S. PATENT DOCUMENTS

| | | | | |
|---|---|---|---|---|
| 2016/0295921 | A1 | 10/2016 | Mironov et al. | |
| 2017/0035112 | A1* | 2/2017 | Thorens | A24F 40/44 |
| 2017/0245551 | A1* | 8/2017 | Reevell | A24F 40/50 |
| 2018/0136073 | A1 | 5/2018 | Lerman et al. | |
| 2018/0136075 | A1 | 5/2018 | Lerman et al. | |
| 2018/0228217 | A1* | 8/2018 | Mironov | A24B 15/167 |
| 2018/0295881 | A1 | 10/2018 | Mironov et al. | |
| 2019/0200677 | A1 | 7/2019 | Chong et al. | |
| 2020/0060344 | A1 | 2/2020 | Tan et al. | |
| 2020/0275698 | A1 | 9/2020 | Mironov et al. | |
| 2021/0161209 | A1 | 6/2021 | Tack et al. | |

FOREIGN PATENT DOCUMENTS

| | | | |
|---|---|---|---|
| CN | 108348004 | A | 7/2018 |
| CN | 109152422 | A | 1/2019 |
| CN | 111109658 | A | 5/2020 |
| FR | 2 573 947 | A1 | 5/1986 |
| JP | 2016-524458 | A | 8/2016 |
| JP | 2016-532432 | A | 10/2016 |
| JP | 2018-514200 | A | 6/2018 |
| JP | 2019-522312 | A | 8/2019 |
| KR | 10-2016-0127793 | A | 11/2016 |
| KR | 10-2018-0115684 | A | 10/2018 |
| RU | 2 698 550 | C2 | 8/2019 |
| WO | WO 2015/175568 | A1 | 11/2015 |
| WO | WO 2016/174179 | A1 | 11/2016 |
| WO | WO 2017/207322 | A1 | 12/2017 |
| WO | WO 2020/025654 | A1 | 2/2020 |

OTHER PUBLICATIONS

Japanese Office Action Issued Mar. 3, 2025, in corresponding Japanese Patent Application No. 2022-669086 (with English Translation). 4 pages.

International Search Report & Written Opinion issued Sep. 22, 2021 in PCT/EP2021/062572, filed on May 12, 2021, 15 pages.

Combined Chinese Office Action and Search Report issued Dec. 31, 2025 in Chinese Patent Application No. 202180034996.6 (with English Translation), 11 pages.

Office Action dated May 15, 2026, issued in corresponding Korean patent application No. 10-2022-7042729 (with English translation).

* cited by examiner

LIQUID-CONVEYING SUSCEPTOR ASSEMBLY FOR CONVEYING AND INDUCTIVELY HEATING AN AEROSOL-FORMING LIQUID

The present disclosure relates to a liquid-conveying susceptor assembly for conveying and inductively heating an aerosol-forming liquid. The invention further relates an inductive heating assembly and an aerosol-generating article, each comprising such a susceptor assembly. The invention also relates to an aerosol-generating system comprising an inductively heating aerosol-generating device and an aerosol-generating article for use with the device.

Generating inhalable aerosols by heating aerosol-forming liquids is generally known from prior art. For this, a liquid aerosol-forming substrate may be conveyed by a wick element from a liquid reservoir into a region outside the reservoir, where it may be vaporized by a heater and exposed to an air path to be subsequently drawn out as an aerosol. The heater may be an inductive heater. In particular, the wick element may be an inductively heatable wick element which comprises a susceptor material and, thus, is capable to perform both functions: wicking and heating. Hence, when being exposed to an alternating magnetic field, the wick element heats up due at least one of eddy currents or magnetic hysteresis losses which are induced in the wick element depending on its magnetic and electrical properties. Accordingly, such a wick element may also be considered as liquid-conveying susceptor or susceptor assembly.

There are various configurations of the wick element, such as mesh configurations. However, many of these configurations are rather complex and thus laborious to manufacture. In addition, heating of the aerosol-forming liquid to be vaporized often is inefficient.

Therefore, it would be desirable to have a liquid-conveying susceptor assembly, an inductive heating assembly, an aerosol-generating article and an aerosol-generating system with the advantages of prior art solutions, whilst mitigating their limitations. In particular, it would be desirable to have a liquid-conveying susceptor assembly, an inductive heating assembly, an aerosol-generating article and an aerosol-generating system including a liquid-conveying susceptor assembly which is easy and inexpensive to manufacture and provides an improved heating efficiency.

According to an aspect of the present invention, there is provided a liquid-conveying susceptor assembly for conveying and inductively heating an aerosol-forming liquid under the influence of an alternating magnetic field. The susceptor assembly comprises an array of inductively heatable longitudinal filaments arranged side by side. The susceptor assembly further comprises an array of transverse filaments arranged side by side and crossing the array of longitudinal filaments transverse to a length extension of the longitudinal filaments. The array of transverse filaments only extends along a length portion of the array of longitudinal filaments such that the susceptor assembly comprises at least one grid portion and at least one non-grid portion.

According to the invention it has been found that the heating efficiency of many known susceptor assemblies is reduced, because certain parts of the susceptor assembly are inductively heatable only to a limited extent or not at all. Basically, this is due to the fact that eddy currents always flow in closed loops within conductors, in planes perpendicular to the magnetic field. As a consequence, the space for eddy currents to flow within certain parts of the susceptor assembly may be limited depending on the geometry and orientation of these parts relative to the direction of the magnetic field passing therethrough. For example, a conductor wire that is arranged perpendicular to the magnetic field typically heats up less than a conductor wire that is arranged parallel to the magnetic field. As a result, parts of the susceptor assembly which are hardly heatable by magnetic induction merely increase the passive thermal mass of the susceptor assembly, because these parts absorb heat energy from other parts of the susceptor assembly rather than generating heat. Even more, the absorbed energy is bound at first and thus not available for vaporizing aerosol-forming liquid.

To remedy this situation, the present invention proposes a susceptor assembly comprising two filament arrays which cross each other only partially. This configuration results in a susceptor assembly having at least one grid portion and at least one non-grid portion. That is, in the grid portion the array of transverse filaments and the array of longitudinal filaments cross each other, whereas in the non-grid portion the susceptor assembly only comprises longitudinal filaments, but no transverse filaments. Due the missing transverse filaments, the non-grid portion preferably only comprises those filaments which are effectively heatable by magnetic induction. Basically, the non-grid portion only comprises those filaments whose geometry and orientation is optimized with regard to the orientation of the alternating magnetic field to be used for heating the susceptor assembly. Preferably, the susceptor assembly is configured such that the longitudinal filaments are arranged substantially parallel to the magnetic field to be used with the susceptor assembly. Hence, the non-grid portion or at least parts of the non-grid portion preferably is used as a heating section of the susceptor assembly to be exposed to an alternating magnetic field in order to vaporize the aerosol-forming liquid. Likewise, the grid-portion preferably is configured to be immersed into a liquid reservoir: Accordingly, the grid portion or at least part of the grid portion may be used as a soaking section.

As used herein, the term "heating section" denotes a section of the susceptor assembly which is configured to be exposed to an alternating magnetic field in order to vaporize the aerosol-forming liquid in order to be inductively heated. Likewise, the term "soaking section" denotes a section of the susceptor assembly which is configured to be immersed into a liquid reservoir.

It has also been found that a susceptor assembly comprising two filament arrays which only cross each other partially is easy and inexpensive to manufacture.

Basically, the array of transverse filaments is used to keep the array of longitudinal filaments together. As a result, the susceptor assembly comprises a good filament bond as well as an improved mechanical and dimensional stability.

Furthermore, it has also been found that filaments are particularly suited for conveying liquids because they inherently provide a capillary action. Moreover, in the grid configuration, the capillary action is further enhanced due to the interstices between the transverse filaments and the longitudinal filaments, that is, due to the narrow spaces aerosol-forming liquid to be conveyed and heated can form a meniscus in the interstices between the crossing filaments.

As at least the longitudinal filaments are inductively heatable, the susceptor assembly is capable to perform both functions: conveying and heating an aerosol-forming liquid. Advantageously, this double function allows for a very material saving and compact design of the susceptor assembly without separate means for conveying and heating. In addition, there is a direct thermal contact between the heat source, that is, the inductively heatable filaments and the aerosol-forming liquid adhering to these filaments. Unlike in case of a heater in contact with a saturated wick, a direct contact between the filaments and a small amount of liquid advantageously allows for flash heating, that is, for a fast onset of evaporation. Preferably, the transverse filaments are inductively heatable as well. It is also possible that the transverse filaments are non-susceptive, that is, inductively non-heatable. In this configuration, the transverse filaments may basically serve to enhance the capillary action on the susceptor assembly and stabilize the filament bond as described above.

As used herein, the term "susceptor material" refers to a material that is capable to convert electromagnetic energy into heat when subjected to an alternating magnetic field. This may be the result of at least one of hysteresis losses or eddy currents induced in the susceptor material, depending on its electrical and magnetic properties. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

As mentioned above, the grid portion of the susceptor assembly or at least a part of the grid portion may be configured to be immersed into a liquid reservoir: Accordingly, that part of the grid portion which is used to be immersed into a liquid reservoir may be denoted as soaking section. For that purpose, the at least one grid portion preferably is located at one of the two longitudinal end portions of the array of longitudinal filaments.

From there, aerosol-forming liquid may be conveyed towards the other longitudinal end portion of the array of longitudinal filaments. There, the conveyed liquid may be vaporized by inductive heating and exposed to an air path to be drawn out as an aerosol. Accordingly, this part may be denoted as a heating section of the susceptor assembly. As further mentioned above, it is the non-grid portion which preferably is configured to be used at least partially as a heating section which is be exposed to an alternating magnetic field in order to vaporize the aerosol-forming liquid. Preferably, the heating season is located at a longitudinal end portion of the array of longitudinal filaments opposite to a soaking section, in particular opposite to the grid portion of the susceptor assembly. Accordingly, the at least one non-grid portion may be located at a longitudinal end portion of the array of longitudinal filaments, preferably at a longitudinal end portion of the array of longitudinal filaments opposite to a soaking section, in particular opposite to the grid portion of the susceptor assembly. As used herein, the longitudinal end portions refer to the end portions of the array of longitudinal filaments as seen along the length extension of the longitudinal filaments.

It is also possible that the at least one grid portion is located between both longitudinal end portions of the array of longitudinal filaments. In this configuration, the susceptor assembly may comprise two non-grid portions, one at each longitudinal end portion of the array of longitudinal filaments. In particular, the susceptor assembly may comprise two heating sections, one at each longitudinal end portion of the array of longitudinal filaments. In use, aerosol-forming liquid may be conveyed from the at least one grid portion serving as soaking section towards non-grid portions at the respective longitudinal end portions. There, the conveyed liquid may be vaporized by inductively heating the respective heating section at the longitudinal end portions. That is, the susceptor assembly may comprise a grid portion that is located between both longitudinal end portions of the array of longitudinal filaments, and two non-grid portions at the longitudinal end portions of the array of longitudinal filaments, one at each end.

Vice versa, the susceptor assembly may comprise a non-grid portion that is located between both longitudinal end portions of the array of longitudinal filaments, and two grid portions at the longitudinal end portions of the array of longitudinal filaments, one at each end.

While in use the heating section is heated up to temperatures sufficient to vaporize the aerosol-forming liquid, the soaking section preferably shall remain at temperatures below the vaporization temperature in order to avoid boiling of the aerosol-forming liquid in the liquid reservoir. Hence, in use the susceptor assembly comprises a temperature profile, in particular along the length extension of the array of longitudinal filaments with sections of higher and lower temperatures. In particular, the filament bundle may comprise a temperature profile showing a temperature increase from temperatures below a vaporization at the at least one soaking section to temperatures above the respective vaporization temperature at the at least one heating section.

The temperature profile actually forming up in use of the susceptor assembly depends on—inter alia—the thermal conductivity and the length of the array of longitudinal filaments. A sufficient temperature gradient between a soaking section and a heating section requires a certain distance between the soaking section and the heating section. Hence, a certain length extension of the longitudinal filaments is required to have the temperature in the soaking section below the vaporization temperature.

Accordingly, a length dimension of the longitudinal filaments may be in a range between 5 millimeter and 50 millimeter, in particular between 10 millimeter and 40 millimeter, preferably between 10 millimeter and 30 millimeter, more preferably between 10 millimeter and 20 millimeter.

As described above, the larger the non-grid portion, the better the heating efficiency. Hence, in order to improve the heating efficiency of the susceptor assembly as much as possible, a length dimension of the non-grid portion along the length extension of the longitudinal filaments may be at least 5 percent, 10 percent, 20 percent, 30 percent, 40 percent, 50 percent, 60 percent, 70 percent, or 80 percent of a length dimension of the longitudinal filaments. This implies a certain maximum length dimension of the grid portion. Accordingly, a length dimension of the grid portion along the length extension of the longitudinal filaments may be at most 90 percent, at most 80 percent, at most 75 percent, at most 70 percent, at most 60 percent, at most 50 percent, at most 40 percent, at most 30 percent, at most 25 percent, or at most 20 percent of a length dimension of the longitudinal filaments.

Vice versa, in order to ensure a sufficient filament bond as well as a sufficient mechanical and dimensional stability of the susceptor assembly, a length dimension of the non-grid portion along the length extension of the longitudinal filaments may be at most 10 percent, 20 percent, 30 percent, 40 percent, 50 percent, 60 percent, 70 percent, 80 percent, or 90 percent of a length dimension of the longitudinal filaments. Likewise, a length dimension of the grid portion along the length extension of the longitudinal filaments may be at least 5 percent, at least 10 percent, at least 20 percent, at least 25 percent, at least 30 percent, at least 40 percent, at least 50 percent, at least 60 percent, at least 70 percent, at least 75 percent, at least 80 percent of a length dimension of the longitudinal filaments.

The susceptor assembly may further comprise a fan-out portion at at least one longitudinal end portion of the array of longitudinal filaments, where the longitudinal filaments diverge from each other. Preferably, the fan-out portion is part of the non-grid portion. Preferably, a heating section of the filament bundle is located at least partially at the fan-out portion, in particular overlaps at least partially with the fan-out portion. Such a fan-out portion may prove beneficial to facilitate the exposure of the vaporized aerosol-forming liquid into an air path and thus facilitate the formation of an aerosol. For this reason, a heating section of the susceptor assembly preferably is located at least partially at the fan-out portion, in particular overlaps at least partially with the fan-out portion.

It is possible, that the susceptor assembly may comprise two fan-out portions, one at each longitudinal end portion of the area of longitudinal filaments. This particular the holes in case the susceptor assembly comprises two non-grid portions, one at each end longitudinal portions, as described above.

The fan-out portion may have a length of at least 5 percent, 10 percent, 20 percent, 30 percent, 40 percent, 50 percent, or 60 percent of a length dimension of the longitudinal filaments. Vice versa, the fan-out portion may have a length of at most 10 percent, 20 percent, 30 percent, 40 percent, or 50 percent of a length dimension of the longitudinal filaments.

The array of transverse filaments may extend along the entire transverse dimension of the array of longitudinal filaments perpendicular to the length extension of the longitudinal filaments. This ensures a sufficient filament bond as well as a sufficient mechanical and dimensional stability of the susceptor assembly. Preferably the transverse filaments are arranged perpendicular to the length extension of the longitudinal filaments such that the grid portion of the susceptor assembly comprises a rectangular grid pattern. It is also possible that the transverse filaments are arranged transvers to length extension of the longitudinal filaments at an angle other than 90 degrees, for example 80 degrees, or 70 degrees, or 60 degrees, or 50 degrees, or 45 degrees, or 30 degrees, or 20 degrees, or 10 degrees.

The array of transverse filaments may be arranged on one of the tow side of the array of longitudinal filaments. In this configuration, the array of transverse filaments may be adhesively bonded to the array of longitudinal filaments, for example, by welding or gluing. It is also possible that the transverse filaments are interwoven with the longitudinal filaments. Advantageously, an interwoven configuration holds the longitudinal filaments tight and in place. In the interwoven configuration, the array of transverse filaments may additionally be adhesively bonded to the array of longitudinal filaments, for example, by welding or gluing.

In general, the susceptor assembly may have any shape of a configuration that is suitable to be implemented an aerosol-generating system, in particular in an aerosol-generating article for use with an inductively heating aerosol-generating device.

As an example, the array of longitudinal filaments may have a substantially cylindrical shape, in particular hollow-cylindrical shape. As another example, the array of longitudinal filaments may have a substantially conical shape or a substantially frustoconical shape, in particular a substantially hollow-conical shape or a substantially hollow-frustoconical shape. In any of these configurations, the longitudinal filaments form the shell surface of the cylindrical, conical, frustoconical, hollow-cylindrical, hollow-conical or hollow-frustoconical shape, respectively. The length axis of the respective shape extends substantially along the length extension of the longitudinal filaments. Advantageously, any of the aforementioned shapes provides an inherent mechanical dimensional stability.

The array of transverse filaments preferably has a substantially ring shape in any of these configurations. That is, the transverse filaments may extend along the circumference of the cylindrically, conically, frustoconically, hollow-cylindrical, hollow-conically or hollow-frustoconically shaped array of longitudinal filaments in the grid portion of the susceptor assembly. The transverse filaments may extend along the inner circumference or along the outer circumference of the cylindrically, conically, frustoconically, hollow-cylindrical, hollow-conically or hollow-frustoconically shaped array of longitudinal filaments. That is, the transverse filaments may be arranged inside or outside the cylindrically, conically, frustoconically, hollow-cylindrical, hollow-conically or hollow-frustoconically shaped array of longitudinal filaments. It is also possible that the transverse filaments are interwoven with the longitudinal filaments. Advantageously, an interwoven configuration holds the longitudinal filaments tight and in place.

Seen as a whole, the susceptor assembly has a substantially crown shape in any of the afore-mentioned configurations.

Furthermore, in case of conical, frustoconical, hollow-conical or hollow-frustoconical shape, the longitudinal filaments diverge from each other towards the base of the respective shape. Therefore, a conically, frustoconically, hollow-conically or hollow-frustoconically shaped array of longitudinal filaments facilitates providing a fan-out portion.

The conical, frustoconical, hollow-conical or hollow-frustoconical shape may include shell surfaces which are non-curved (straight) along the length extension of the longitudinal filaments. In this configuration, the longitudinal filaments are substantially non-curved (straight, non-bent). This configuration does not exclude little bending of the longitudinal filaments, that is, large curvature radii along the length extension of the longitudinal filaments. As used herein, large curvature radii may include curvature radii being 10 times, in particular 20 times or 50 times or particular 100 times larger than the total length of the longitudinal filaments. The conical, frustoconical, hollow-conical or hollow-frustoconical shape may also include shell surfaces which are curved along the length extension of the longitudinal filaments. In this configuration, the longitudinal filaments are curved.

It is also possible that the array of longitudinal filaments comprises a plurality of coaxial sub-arrays of longitudinal filaments each having a cylindrical, conical, frustoconical, hollow-cylindrical, hollow-conical or hollow-frustoconical shape. That is, the sub-arrays form different layers of a cylindrical, conical, frustoconical, hollow-cylindrical, hollow-conical or hollow-frustoconical susceptor assembly, wherein the layers are arranged coaxially to each other, one above the other or surrounding the other. In the configuration, one or more transverse filaments may extend along the circumference of each cylindrically, conically, frustoconically, hollow-cylindrical, hollow-conically or hollow-frustoconically shaped sub-array. That is, in this configuration, the array of transverse filaments comprises a plurality of ring shaped transverse filaments or a plurality of ring shaped sub-arrays of transverse filaments, wherein the plurality of ring shaped transverse filaments or the plurality of ring shaped sub-arrays of transverse filaments are arranged coaxially to each other Furthermore, it is possible that the array of longitudinal filaments is rolled up spirally around an axis which extends substantially along, in particular parallel to a length extension of the longitudinal filaments, such as form a rolled, snail-shaped susceptor assembly (like a roulade). In this configuration, the array of transverse filaments also has a spiral shape, wherein transverse filaments extend along the winding direction of the spiral shape.

As mentioned above, the array of transverse filaments may be adhesively bonded to the array of longitudinal filaments, for example, by welding or gluing. It is also possible that the array of transverse filaments is interwoven with the array of longitudinal filaments.

A mean center-to-center distance between adjacent longitudinal filaments may be in a range between 0.1 millimeter and 2 millimeter, in particular between 0.1 millimeter and 1 millimeter. In particular, a mean center-to-center distance between adjacent longitudinal filaments may be at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. These values of the center-to-center distance are particularly suitable to ensure a sufficient capillary action. It is also possible that a mean center-to-center distance between adjacent longitudinal filaments is up to 1 millimeter or even up to 2 millimeter. The latter values may refer to those configurations of the susceptor assembly having a fan-out portion. In particular, a mean center-to-center distance between adjacent longitudinal filaments may be different from, in particular larger than a mean center-to-center distance between adjacent transverse filaments.

Likewise, mean center-to-center distance between adjacent transverse filaments may be in a range between 0.025 millimeter and 0.5 millimeter. In particular, a mean center-to-center distance between adjacent transverse filaments may be at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. It is also possible that a mean center-to-center distance between adjacent filaments is up to 1 millimeter or even up to 2 millimeter.

As mentioned above, the longitudinal filaments are configured to be inductively heatable. Accordingly, the longitudinal filaments preferably comprise one or more first filaments including a first susceptor material. Likewise, the transverse filaments may also comprise one or more first filaments including a first susceptor material.

Preferably, the plurality of first filaments are solid material filaments. Solid material filaments are inexpensive and easy to manufacture. In addition, solid material filaments provide a good mechanical stability, thus making the filament bundle robust. For the same reasons, the plurality of first filaments preferably are single grade material filaments. Accordingly, the plurality of first filaments preferably are made of the first susceptor material.

As used herein, the term "susceptor material" refers to a material that is capable to convert electromagnetic energy into heat when subjected to an alternating magnetic field. This may be the result of at least one of hysteresis losses or eddy currents induced in the susceptor material, depending on its electrical and magnetic properties. Hysteresis losses occur in ferromagnetic or ferrimagnetic susceptor materials due to magnetic domains within the material being switched under the influence of an alternating electromagnetic field. Eddy currents are induced in electrically conductive susceptor materials. In case of an electrically conductive ferromagnetic or ferrimagnetic susceptor material, heat is generated due to both, eddy currents and hysteresis losses.

Accordingly, the first susceptor material may be formed from any material that can be inductively heated to a temperature sufficient to generate an aerosol from the aerosol-forming substrate. Therefore, the first susceptor material may comprise or may be made of a material that is at least one of electrically conductive and ferromagnetic or ferrimagnetic, respectively. That is, the first susceptor material may comprise or may be made of one of a ferrimagnetic material, or a ferromagnetic material, or an electrically conductive material, or electrically conductive ferrimagnetic material or electrically conductive ferromagnetic material.

For example, the first susceptor material may comprise or may be made of one of a ferrite, aluminium, iron, nickel, copper, bronze, cobalt, a nickel alloy, plain-carbon steel, stainless steel, ferritic stainless steel, ferromagnetic stainless steel, martensitic stainless steel, or austenitic stainless steel.

The wicking or capillary action generally relies on a reduction in the surface energy of the two separate surfaces, the liquid surface and the solid surface of the filaments. The wicking or capillary action includes an effect that depends on the radius of curvature of both the liquid surface and the filaments. Hence, there may be a need for large surface areas and small radii of curvature, both of which are achieved by the small diameter of the filaments and the array-like nature of the susceptor assembly. The radius of curvature of the filaments is important as the liquid wets the filaments.

Accordingly, the plurality of first filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Vice versa, the diameter of the first filaments preferably has a certain minimum that is related to the so-called skin depth. The skin depth is a measure of how far electrical conduction takes place in an electrically conductive susceptor material when being inductively heated. Unlike DC currents, AC currents mainly flow at the 'skin' of an electrical conductor between an outer surface of the conductor and a level which is called the skin depth. The AC current density is largest near the surface of the conductor, and decreases with greater depths in the conductor. This phenomenon is known as skin effect which basically is due to opposing eddy currents induced by the alternating magnetic field. Preferably, the plurality of first filaments have a diameter of at least twice the skin depth in order to induce a sufficient amount of eddy currents and thus to generate a sufficient amount of heat energy.

In general, the skin depth is a function of the permeability and the electrical conductivity of the susceptor material as well as of the frequency of the AC driving current or frequency of the alternating magnetic field, respectively. Preferably, the susceptor assembly is operated with a high-frequency alternating magnetic field. As referred to herein, the high-frequency electromagnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

Depending on the materials and the frequency of the alternating magnetic field used, the plurality of first filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In general, the plurality of first filaments may have any cross-sectional shape suitable for conveying aerosol-forming liquid arranged in an array. Accordingly, at least one of, in particular each one of the plurality of first filaments may have a circular, an ellipsoidal, an oval, a triangular, a rectangular, a quadratic, a hexagonal or a polygonal cross-section. Preferably, all first filaments have the same cross-section. It is also possible that one or more filaments of the plurality of first filaments have a cross section that is different from the cross-sections of one or more other filaments of the plurality of first filaments. Preferably, the plurality of first filaments have a circular, an ellipsoidal or an oval cross-section. Advantageously, the latter cross-sectional shapes ensure that the filaments in the respective array are—if at all—only in a line contact with each other, but not in an area contact. Due to this, narrow spaces are formed between the pluralities of filaments on its own which promote the capillary action required for conveying the aerosol-forming liquid.

The plurality of first filaments may be surface treated. In particular, the plurality of first filaments may comprise at least partially a surface coating, for example, an aerosolization enhancing surface coating, a liquid-adhesive surface coating, a liquid repellent surface coating, or an antibacterial surface coating. The aerosolization enhancing surface coating advantageously may enhance the variety of a user's experience. The liquid adhesive surface coating may be beneficial with regard to an enhancement of the capillary action of the filament bundle. The antibacterial surface coating may serve to reduce a bacterial contamination. A liquid repellent coating, in particular at an extremity of the filaments, may avoid liquid dropping.

Depending on the available space, the dimensions of the filaments and the amount of aerosol-forming liquid to be conveyed and heated, the plurality of first filaments in the filament bundle may comprise 2 to 100 first filaments, in particular 10 to 80 first filaments, preferably 20 to 80 first filaments, preferably 30 to 50 first filaments, for example 40 first filaments.

Preferably, the number of the longitudinal filaments is larger than the number of transverse filaments. Accordingly, the array of longitudinal filaments may comprise more first filaments than the array of transverse filaments.

In addition to the plurality of first filaments, at least one of the longitudinal filaments and the transverse filaments may further comprise a plurality of second filaments including a second susceptor material. While the first susceptor material of the plurality of first filaments may be optimized with regard to heat loss and thus heating efficiency, the second susceptor material may be advantageously used as temperature marker. For this, the second susceptor material preferably comprises one of a ferrimagnetic material or a ferromagnetic material. In particular, the second susceptor material may be chosen such as to have a Curie temperature corresponding to a predefined heating temperature of the susceptor assembly. At its Curie temperature, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached.

Preferably, the first susceptor material is different from the second susceptor material.

The second susceptor material preferably has a Curie temperature that is lower than 500 degree Celsius. In particular, the second susceptor material may have a Curie temperature below 350 degree Celsius, preferably below 300 degree Celsius, more preferably below 250 degree Celsius, even more preferably below 200 degree Celsius, most preferably below 150 degree Celsius. Preferably, the Curie temperature is chosen such as to be below the boiling point of the aerosol-forming liquid to be vaporized in order to prevent the generation of hazardous components in the aerosol.

Suitable materials for the second susceptor material may include nickel and certain nickel alloys. Likewise, the second susceptor material may comprise one of mu-metal or permalloy. In particular, the second susceptor material may have a relative maximum magnetic permeability of at least 80 or at least 100, more particularly at least 1000, preferably at least 10000 for frequencies up to 50 kHz and a temperature of 25 degrees Celsius.

Apart from that, the plurality of second filaments may have the same or similar properties as described before with regard to the plurality of first filaments.

Accordingly, the plurality of second filaments may be solid material filaments. Furthermore, the plurality of second filaments may be single grade material filaments. In particular, the plurality of second filaments may be made of the second susceptor material.

Likewise, the plurality of second filaments may be surface treated. In particular, the plurality of second filaments may comprise a surface coating, for example, an aerosolization enhancing surface coating, a liquid-adhesive surface coating, a liquid repellent surface coating, or an antibacterial surface coating.

Furthermore, at least one of, in particular each of the plurality of second filaments may have a circular, an ellipsoidal, an oval, a triangular, a rectangular, a quadratic, a hexagonal or a polygonal cross-section.

For the same reasons as discussed above with regard to the plurality of first filaments, the plurality of second filaments may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter. Likewise, the plurality of second filaments may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

In either one of the array of longitudinal filaments and the array of transverse filaments, the plurality of first filaments and the plurality of second filaments may have the same diameter. As a consequence, the capillary action and the shear rate are uniform throughout the susceptor assembly. Vice versa, it is also possible that the plurality of first filaments and the plurality of second filaments have a different diameter. Different filament diameters may be used to vary the capillary action throughout the susceptor assembly.

At least one of the array of longitudinal filaments and the array of transverse filaments comprises 1 to 100 second filaments, in particular 10 to 80 second filaments, preferably 20 to 60 second filaments, preferably 30 to 50 second filaments, for example 40 second filaments. As discussed above, the number of the longitudinal filaments preferably is larger than the number of transverse filaments. Accordingly, the array of longitudinal filaments may comprise more second filaments than the array of transverse filaments.

In general, the number of first filaments may be the same as the number of second filaments in either one of the array of longitudinal filaments and the array of transverse filaments. However, is also possible that the number of first filaments is different from the number of second filaments. In particular, the number of first filaments may be larger, for example two times or three times or four times or five times or six times or seven times or eight times or nine times or ten times larger than the number of second filaments. This particular holds in case the second filaments are used as temperature makers for which a small number of second filaments is sufficient.

The one or more first filaments and the one or more second filaments are substantially equally distributed throughout at least one of the array of longitudinal filaments and the array of transverse filaments. A uniform distribution may support a uniform capillary action throughout the susceptor. Alternatively, it is also possible that the one or more first filaments and the one or more second filaments are substantially unequally distributed throughout at least one of the array of longitudinal filaments and the array of transverse filaments. For example, the plurality of second filaments may be randomly distributed throughout the filament bundle. Furthermore, it is possible that the plurality of second filaments may have a length that is different from a length of the plurality of first filaments. In particular, a length of the plurality of second filaments may be shorter than a length of the plurality of first filaments. Vice versa, a length of the plurality of second filaments may be larger than a length of the plurality of first filaments.

The array of transverse filaments may not comprise any second filaments.

According to another aspect of the present invention, there is provided an inductive heating assembly for conveying and inductively heating an aerosol-forming liquid. The heating assembly comprises at least one liquid-conveying susceptor assembly according to the present invention and as described herein. The heating assembly further comprises at least one induction source configured and arranged to generate an alternating magnetic field in a heating section of the at least one liquid-conveying susceptor assembly, in particular in a heating section of the filament bundle.

For generating the alternating magnetic field, the induction source may comprise at least one inductor, preferably at least one induction coil. Preferably, the induction coil is arranged at least around the heating section of the liquid-conveying susceptor assembly, in particular at least around the heating section of the filament bundle.

The at least one induction coil may be a helical coil or flat planar coil, in particular a pancake coil or a curved planar coil. Use of a flat spiral coil allows a compact design that is robust and inexpensive to manufacture. Use of a helical induction coil advantageously allows for generating a homogeneous alternating magnetic field. As used herein a "flat spiral coil" means a coil that is generally planar, wherein the axis of winding of the coil is normal to the surface in which the coil lies. The flat spiral induction coil can have any desired shape within the plane of the coil. For example, the flat spiral coil may have a circular shape or may have a generally oblong or rectangular shape. However, the term "flat spiral coil" as used herein covers both, coils that are planar as well as flat spiral coils that are shaped to conform to a curved surface. For example, the induction coil may be a "curved" planar coil arranged at the circumference of a preferably cylindrical coil support, for example ferrite core. Furthermore, the flat spiral coil may comprise for example two layers of a four-turn flat spiral coil or a single layer of four-turn flat spiral coil.

The at least one induction coil may be held within one of a housing of the heating assembly, or a main body or a housing of an aerosol-generating device which comprises the heating assembly.

As described further above with regard to the susceptor assembly, the heating section of the liquid-conveying susceptor assembly, in particular the heating section of the non-grid portion, may be located at one of the two longitudinal end portions of the array of longitudinal filaments. This configuration may advantageously prevent boiling of the aerosol-forming liquid in case the susceptor assembly comprises a soaking section at the opposite end longitudinal end portion of the array of longitudinal filaments, in particular in the grid-portion.

The length of the heating section may be chosen such as to generate a desired amount of aerosol. The shorter the heating section, the less aerosol-forming liquid is vaporized and, thus the less aerosol is generated. Accordingly, the heating section of the non-grid portion may have a length of at least 5 percent, 10 percent, 20 percent, 30 percent, 40 percent, 50 percent, 60 percent, 70 percent, 80 percent of a length dimension of the non-grid portion along the length extension of the longitudinal filaments. Likewise, the heating section of the non-grid portion may have a length of at most 10 percent, 20 percent, 30 percent, 40 percent, 50 percent, 60 percent, 70 percent, 80 percent, 90 percent or 100 percent of a length dimension of the non-grid portion along the length extension of the longitudinal filaments.

The susceptor assembly may be arranged off-center with regard to a symmetry axis of the alternating magnetic field generated by the induction source in use of the heating assembly. Advantageously, due to the off-center arrangement, that is, an asymmetric arrangement, the susceptor assembly is arranged in a region of the alternating magnetic field having a higher field density as compared to a symmetric center arrangement. As a consequence, the heating efficiency advantageously is enhanced.

The induction source may comprise an alternating current (AC) generator. The AC generator may be powered by a power supply of the aerosol-generating device. The AC generator is operatively coupled to the at least one induction coil. In particular, the at least one induction coil may be integral part of the AC generator. The AC generator is configured to generate a high frequency oscillating current to be passed through the at least one induction coil for generating an alternating magnetic field. The AC current may be supplied to the at least one induction coil continuously following activation of the system or may be supplied intermittently, such as on a puff by puff basis.

Preferably, the induction source comprises a DC/AC converter connected to the DC power supply including an LC network, wherein the LC network comprises a series connection of a capacitor and the inductor.

The induction source preferably is configured to generate a high-frequency magnetic field. As referred to herein, the high-frequency magnetic field may be in the range between 500 kHz (kilo-Hertz) to 30 MHz (Mega-Hertz), in particular between 5 MHz (Mega-Hertz) to 15 MHz (Mega-Hertz), preferably between 5 MHz (Mega-Hertz) and 10 MHz (Mega-Hertz).

The heating assembly may further comprise a controller configured to control operation of the heating assembly. In particular, the controller may be configured to control operation of the induction source, preferably in a closed-loop configuration, for controlling heating of the aerosol-forming liquid to a pre-determined operating temperature. The operating temperature used for heating the aerosol-forming liquid may be in a range The operating temperature used for heating the aerosol-forming liquid may be in a range between 100 degree Celsius and 300 degree Celsius, in particular between 150 degree Celsius and 250 degree Celsius, for example 230 degree Celsius. These temperatures are typical operating temperatures for heating but not combusting the aerosol-forming substrate. The aerosol-forming liquid may be a water-based aerosol-forming liquid or an oil-based aerosol-forming liquid.

The controller may comprise a microprocessor, for example a programmable microprocessor, a microcontroller, or an application specific integrated chip (ASIC) or other electronic circuitry capable of providing control. The controller may comprise further electronic components, such as at least one DC/AC inverter and/or power amplifiers, for example a Class-C power amplifier or a Class-D power amplifier or Class-E power amplifier. In particular, the induction source may be part of the controller.

The controller may be or may be art of an overall controller of an aerosol-generating device which the heating assembly according to the present invention is part of.

The heating assembly may comprise a power supply, in particular a DC power supply configured to provide a DC supply voltage and a DC supply current to the induction source. Preferably, the power supply is a battery such as a lithium iron phosphate battery. As an alternative, the power supply may be another form of charge storage device such as a capacitor. The power supply may require recharging, that is, the power supply may be rechargeable. The power supply may have a capacity that allows for the storage of enough energy for one or more user experiences. For example, the power supply may have sufficient capacity to allow for the continuous generation of aerosol for a period of around six minutes or for a period that is a multiple of six minutes. In another example, the power supply may have sufficient capacity to allow for a predetermined number of puffs or discrete activations of the induction source. The power supply may be an overall power supply of an aerosol-generating device the heating assembly according to the present invention is part of.

The heating assembly may further comprise a flux concentrator arranged around at least a portion of the induction coil and configured to distort the alternating magnetic field of the at least one inductive source towards the susceptor assembly, in particular towards a heating section of the susceptor assembly, in use of the heating assembly. Preferably, the flux concentrator comprises a flux concentrator foil, in particular a multi-layer flux concentrator foil.

Further features and advantages of the heating assembly according to the present invention have already been described with regard to the susceptor assembly of the present invention and thus equally apply.

According to the invention, there is also provided an aerosol-generating article for use with an inductively heating aerosol-generating device. The article comprises at least at least one reservoir for storing aerosol-forming liquid, wherein the liquid reservoir comprises an outlet. The article further comprises at least one liquid-conveying susceptor assembly according to the present invention and as described herein for delivering aerosol-forming liquid from the liquid reservoir through the outlet into a region outside the liquid reservoir.

As used herein, the term "aerosol-generating article" refers to a consumable for usage with an inductively heating aerosol-generating device, in particular a consumable to be discarded after a single use. For example, the article may be a cartridge to be inserted into an inductively heating aerosol-generating device. Preferably, the aerosol-generating article comprises at least one aerosol-forming liquid that is intended to be heated rather than combusted and that, when heated, releases volatile compounds that can form an aerosol.

Preferably, the susceptor assembly comprises at least one soaking section arranged in the liquid reservoir. As described before, the soaking section of the susceptor assembly may be located at a longitudinal end portion of the array of longitudinal filaments. In this configuration, the susceptor assembly may comprise a heating section at the opposite end portion of the array of longitudinal filaments.

Preferably, the soaking section is part of the grid portion or, vice versa, the grid portion preferably is part of the soaking section.

The length of the soaking section may advantageously be used to a control the amount of aerosol-forming liquid to be soaked and conveyed from the liquid reservoir. Accordingly, the soaking section of the grid portion may have a length of at most 10 percent, at most 20 percent, at most 30 percent, at most 40 percent, at most 50 percent or at most 60 percent of the grid portion along the length extension of the longitudinal filaments. Vice versa, the at least one soaking section of the grid portion may have a length of at least 10 percent, at least 20 percent, at least 30 percent, at least 40 percent, at least 50 percent or at least 60 percent of the grid portion along the length extension of the longitudinal filaments. In particular, the at least one soaking section of the grid portion may have a length of 10 percent, 20 percent, 30 percent, 40 percent, 50 percent or 60 percent of the grid portion along the length extension of the longitudinal filaments.

Likewise, the soaking section of the susceptor assembly may be located between two longitudinal end portions of the array of longitudinal filaments. In this configuration, both longitudinal end portions of the susceptor assembly may be used as heating sections. In particular, the susceptor assembly may comprise a non-grid portion that is located between both longitudinal end portions of the array of longitudinal filaments, and two grid portions at the longitudinal end portions of the array of longitudinal filaments, one at each end.

It is also possible that the susceptor assembly comprises two soaking sections, each being arranged in the liquid reservoir. Preferably, the two soaking sections may be arranged at the longitudinal end portions of the array of longitudinal filaments, one at each end. In this configuration, the portion between both longitudinal end portions of the array of longitudinal filaments may be used as heating section. In particular, the susceptor assembly may comprise a grid portion that is located between both longitudinal end portions of the array of longitudinal filaments, and two non-grid portions at the longitudinal end portions of the array of longitudinal filaments, one at each end.

The aerosol-generating article may be an aerosol-generating article for single use or an aerosol-generating article for multiple uses. In the latter case, the aerosol-generating article may be refillable. That is, the reservoir may be refillable with an aerosol-forming liquid. In any configuration, the aerosol-generating article may further comprise an aerosol-forming liquid contained in the liquid reservoir.

As used herein, the term "aerosol-forming liquid" relates to a liquid capable of releasing volatile compounds that can form an aerosol upon heating the aerosol-forming liquid. The aerosol-forming liquid may contain both, solid and liquid aerosol-forming material or components. The aerosol-forming liquid may comprise a tobacco-containing material containing volatile tobacco flavor compounds, which are released from the liquid upon heating. Alternatively or additionally, the aerosol-forming liquid may comprise a non-tobacco material. The aerosol-forming liquid may further comprise an aerosol former. Examples of suitable aerosol formers are glycerin and propylene glycol. The aerosol-forming liquid may also comprise other additives and ingredients, such as nicotine or flavourants. In particular, the aerosol-forming liquid may include water, solvents, ethanol, plant extracts and natural or artificial flavors. The aerosol-forming liquid may be a water-based aerosol-forming liquid or an oil-based aerosol-forming liquid.

In addition, the article may comprise a mouthpiece. As used herein, the term "mouthpiece" means a portion of the article that is placed into a user's mouth in order to directly inhale an aerosol from the article. Preferably, the mouthpiece comprises a filter. The filter may be used to filter out undesired components of the aerosol. The filter may also comprise an add-on material, for example, a flavor material to be added to the aerosol.

The article may have a simple design. The article may have a housing comprising the liquid reservoir and—if present—the second liquid reservoir. The housing is preferably a rigid housing comprising a material that is impermeable to liquid. The housing may comprise or may be made of one of PEEK (polyether ether ketone), PP (polypropylene), PE (polyethylene) or PET (polyethylene terephthalate). PP, PE and PET are particularly cost-effective and easy to mold, in particular to extrude. As used herein "rigid housing" means a housing that is self-supporting. The aerosol-forming substrate is a substrate capable of releasing volatile compounds that can form an aerosol. The housing may also comprise flexible sections or collapsed sections. The housing may further comprise at least one breather hole for volume compensation.

Further features and advantages of the aerosol-generating article according to the present invention have already been described with regard to the susceptor assembly of the present invention and thus equally apply.

According to the invention, there is also provided an aerosol-generating system comprising an inductively heating aerosol-generating device, an aerosol-generating article for use with the aerosol-generating device, and an inductive heating assembly according to the present invention and as described herein. The induction source of the heating assembly may be part of the inductively heating aerosol-generating device, and the liquid-conveying susceptor assembly of the heating assembly may be part of the aerosol-generating article.

If present, a controller of the heating assembly may be part of aerosol-generating device, in particular arranged in the aerosol-generating device. Preferably, a controller of the aerosol-generating device may include or may be a controller of the heating assembly.

Likewise, if present, a power supply of the heating assembly may be part of aerosol-generating device, in particular arranged in the aerosol-generating device. Preferably, a power supply of the aerosol-generating device may include or may be a power supply of the heating assembly.

As used herein, the term "aerosol-generating device" is used to describe an electrically operated device that is capable of interacting with at least one aerosol-generating article including at least one aerosol-forming liquid such as to generate an aerosol by inductively heating the susceptor assembly and thus the aerosol-forming liquid within the article. Preferably, the aerosol-generating device is a puffing device for generating an aerosol that is directly inhalable by a user through the user's mouth. In particular, the aerosol-generating device is a hand-held aerosol-generating device.

The aerosol-generating device may comprise a receiving cavity for removably receiving at least a portion of the aerosol-generating article.

The induction coil of the induction source may be arranged such as to surround at least a portion of the receiving cavity, in particular such as to surround at least a portion of the susceptor assembly of the aerosol-generating article, in particular a heating section of the non-grid portion, when the aerosol-generating article is received in the receiving cavity.

Besides the specific configuration of the susceptor assembly of the heating assembly, the aerosol-generating article of the aerosol-generating system may be an aerosol-generating article according to the present invention and as described above.

Further features and advantages of the aerosol-generating system according to the present invention have been described with regard to susceptor assembly, the aerosol-generating article and the heating assembly according to the present invention and therefore equally apply.

The invention is defined in the claims. However, below there is provided a non-exhaustive list of non-limiting examples. Any one or more of the features of these examples may be combined with any one or more features of another example, embodiment, or aspect described herein.

Example Ex1: A liquid-conveying susceptor assembly for conveying and inductively heating an aerosol-forming liquid under the influence of an alternating magnetic field, the susceptor assembly comprising an array of inductively heatable longitudinal filaments arranged side by side, and an array of transverse filaments arranged side by side and crossing the array of longitudinal filaments transverse to a length extension of the longitudinal filaments, wherein the array of transverse filaments only extends along a length portion of the array of longitudinal filaments such that the susceptor assembly comprises at least one grid portion and at least one non-grid portion.

Example Ex2: The susceptor assembly according to example Ex1, wherein the at least one grid portion is located at one of the two longitudinal end portions of the array of longitudinal filaments.

Example Ex3: The susceptor assembly according to example Ex1, wherein the at least one grid portion is located between both longitudinal end portions of the array of longitudinal filaments.

Example Ex4: The susceptor assembly according to anyone of the preceding examples, wherein the at least one non-grid portion is located at a longitudinal end portion of the array of longitudinal filaments.

Example Ex5: The susceptor assembly according to any one of examples Ex1 or Ex2, wherein the at least one non-grid portion is located between both longitudinal end portions of the array of longitudinal filaments.

Example Ex6: The susceptor assembly according to any one of the preceding examples, wherein a length dimension of the longitudinal filaments is in a range between 5 millimeter and 50 millimeter, in particular between 10 millimeter and 40 millimeter, preferably between 10 millimeter and 30 millimeter, more preferably between 10 millimeter and 20 millimeter.

Example Ex7: The susceptor assembly according to any one of the preceding examples, wherein a length dimension of the non-grid portion along the length extension of the longitudinal filaments is at least 5 percent, 10 percent, 20 percent, 30 percent, 40 percent, 50 percent, 60 percent, 70 percent, or 80 percent of the length dimension of the longitudinal filaments.

Example Ex8: The susceptor assembly according to any one of the preceding examples, wherein a length dimension of the non-grid portion along the length extension of the longitudinal filaments is at most 10 percent, 20 percent, 30 percent, 40 percent, 50 percent, 60 percent, 70 percent, 80 percent, or 90 percent of the length dimension of the longitudinal filaments.

Example Ex9: The susceptor assembly according to any one of the preceding examples, wherein a length dimension of the grid portion along the length extension of the longitudinal filaments is at most 90 percent, at most 80 percent, at most 75 percent, at most 70 percent, at most 60 percent, at most 50 percent, at most 40 percent, at most 30 percent, at most 25 percent, or at most 20 percent of the length dimension of the longitudinal filaments.

Example Ex10: The susceptor assembly according to any one of the preceding examples, wherein a length dimension of the grid portion along the length extension of the longitudinal filaments is at least 5 percent, at least 10 percent, at least 20 percent, at least 25 percent, at least 30 percent, at least 40 percent, at least 50 percent, at least 60 percent, at least 70 percent, at least 75 percent, at least 80 percent of the length dimension of the longitudinal filaments.

Example Ex11: The susceptor assembly according to any one of the preceding examples, wherein the array of transverse filaments extends along the entire transverse dimension of the array of longitudinal filaments perpendicular to the length extension of the longitudinal filaments.

Example Ex12: The susceptor assembly according to any one of the preceding examples, wherein the transverse filaments are arranged perpendicular to the length extension of the longitudinal filaments.

Example Ex13: The susceptor assembly according to any one of the preceding examples, wherein the array of longitudinal filaments has a substantially cylindrical shape or a substantially hollow cylindrical shape.

Example Ex14: The susceptor assembly according to any one examples Ex1 to Ex12, wherein the array of longitudinal filaments has a substantially conical shape or a substantially frusto-conical shape, in particular a substantially hollow conical shape or a substantially hollow frusto-conical shape.

Example Ex15: The susceptor assembly according to any one of the preceding examples, wherein the array of transverse filaments has a substantially ring shape.

Example Ex16: The susceptor assembly according to any one of the preceding examples, wherein a mean center-to-center distance between adjacent longitudinal filaments is in a range between 0.1 millimeter and 2 millimeter, in particular between 0.1 millimeter and 1 millimeter.

Example Ex17: The susceptor assembly according to any one of the preceding examples, wherein a mean center-to-center distance between adjacent transverse filaments is in a range between 0.025 millimeter and 0.5 millimeter.

Example Ex18: The susceptor assembly according to anyone of the preceding examples, wherein the transverse filaments are inductively heatable.

Example Ex19: The susceptor assembly according to any one of the preceding examples, wherein at least one of the longitudinal filaments and the transverse filaments comprise one or more first filaments including a first susceptor material.

Example Ex20: The susceptor assembly according to example Ex19, wherein the one or more first filaments are solid material filaments.

Example Ex21: The susceptor assembly according to any one of examples Ex19 or Ex20, wherein the one or more first filaments are single grade material filaments.

Example Ex22: The susceptor assembly according to any one of examples Ex19 to Ex21, wherein the one or more first filaments are made of the first susceptor material.

Example Ex23: The susceptor assembly according to any one of examples Ex19 to Ex22, wherein the first susceptor material comprises or is made of one of a ferrimagnetic material, or a ferromagnetic material, or an electrically conductive material, or electrically conductive ferrimagnetic material or electrically conductive ferromagnetic material.

Example Ex24: The susceptor assembly according to any one of examples Ex19 to Ex23, wherein the first susceptor material comprises or is made of one of a ferrite, aluminum, iron, nickel, copper, bronze, cobalt, a nickel alloy, plain-carbon steel, stainless steel, ferritic stainless, steel, ferromagnetic stainless steel, martensitic stainless steel, or austenitic stainless steel.

Example Ex25: The susceptor assembly according to any one of examples Ex19 to Ex24, wherein the plurality of first filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex26: The susceptor assembly according to any one of examples Ex19 to Ex25, wherein the plurality of first filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex27: The susceptor assembly according to any one of examples Ex19 to Ex26, wherein the plurality of first filaments have a circular, an ellipsoidal, an oval, a triangular, a rectangular, a quadratic, a hexagonal or a polygonal cross-section.

Example Ex28: The susceptor assembly according to any one of examples Ex19 to Ex27, wherein the plurality of first filaments are surface treated, in particular comprise a surface coating, for example, an aerosolization enhancing surface coating, a liquid-adhesive surface coating, a liquid repellent surface coating, or an antibacterial surface coating.

Example Ex29: The susceptor assembly according to any one of examples Ex19 to Ex28, wherein at least one of the array of longitudinal filaments and the array of transverse filaments comprises 2 to 100 first filaments, in particular 10 to 80 first filaments, preferably 20 to 80 first filaments, preferably 30 to 50 first filaments.

Example Ex30: The susceptor assembly according to any one of examples Ex19 to Ex29, wherein at least one of the longitudinal filaments and the transverse filaments comprises one or more second filaments including a second susceptor material.

Example Ex31: The susceptor assembly according to example Ex30, wherein the second susceptor material comprises one of a ferrimagnetic material or a ferromagnetic material.

Example Ex32: The susceptor assembly according to any one of examples Ex30 or Ex31, wherein the second susceptor material has a Curie temperature below 500 degree Celsius, in particular below 350 degree Celsius, preferably below 300 degree Celsius, more preferably below 250 degree Celsius, even more preferably below 200 degree Celsius, most preferably below 150 degree Celsius.

Example Ex33: The susceptor assembly according to any one of examples Ex30 to Ex32, wherein the second susceptor material comprises one of nickel, a nickel alloy, mu-metal or permalloy Example Ex34: The susceptor assembly according to any one of examples Ex30 to Ex33, wherein the plurality of second filaments are solid material filaments.

Example Ex35: The susceptor assembly according to any one of examples Ex30 to Ex34, wherein the plurality of second filaments are single grade material filaments.

Example Ex36: The susceptor assembly according to any one of examples Ex30 to Ex35, wherein the plurality of second filaments are made of the second susceptor material.

Example Ex37: The susceptor assembly according to any one of examples Ex30 to Ex36, wherein the plurality of second filaments are surface treated, in particular comprise a surface coating, for example, an aerosolization enhancing surface coating, a liquid-adhesive surface coating, a liquid repellent surface coating, or an antibacterial surface coating.

Example Ex38: The susceptor assembly according to any one of examples Ex30 to Ex37, wherein at least one of, in particular each of the plurality of second filaments has a circular, an ellipsoidal, an oval, a triangular, a rectangular, a quadratic, a hexagonal or a polygonal cross-section.

Example Ex39: The susceptor assembly according to any one of examples Ex30 to Ex38, wherein the plurality of second filaments have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

Example Ex40: The susceptor assembly according to any one of examples Ex30 to Ex39, wherein the plurality of second filaments have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex41: The susceptor assembly according to any one of examples Ex30 to Ex40, wherein the plurality of first filaments and the plurality of second filaments have the same diameter.

Example Ex42: The susceptor assembly according to any one of examples Ex30 to Ex40, wherein the plurality of first filaments and the plurality of second filaments have a different diameter.

Example Ex43: The susceptor assembly according to any one of examples Ex30 to Ex42, wherein at least one of the array of longitudinal filaments and the array of transverse filaments comprises 1 to 100 second filaments, in particular 10 to 80 second filaments, preferably 20 to 60 second filaments, preferably 30 to 50 second filaments, for example 40 second filaments.

Example Ex44: The susceptor assembly according to any one of examples Ex30 to Ex43, wherein the one or more first filaments and the one or more second filaments are substantially equally distributed throughout at least one of the array of longitudinal filaments and the array of transverse filaments.

Example Ex45: The susceptor assembly according to any one of examples Ex30 to Ex43, wherein the one or more first filaments and the one or more second filaments are substantially unequally distributed throughout at least one of the array of longitudinal filaments and the array of transverse filaments.

Example Ex46: The susceptor assembly according to any one of the preceding examples, wherein a mean distance between adjacent longitudinal filaments is at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex47: The susceptor assembly according to any one of the preceding examples, wherein a mean distance between adjacent transverse filaments is at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter.

Example Ex48: The susceptor assembly according to any one of the preceding examples, wherein the susceptor assembly comprises a fan-out portion at at least one longitudinal end portion of the array of longitudinal filaments, where the longitudinal filaments diverge from each other.

Example Ex49: The susceptor assembly according to example Ex48, wherein the fan-out portion has a length of at least 5 percent, 10 percent, 20 percent, 30 percent, 40 percent, 50 percent, or 60 percent of a length dimension of the longitudinal filaments Example Ex50: The susceptor assembly according to any one of examples Ex48 or Ex49, wherein the fan-out portion has a length of at most 10 percent, 20 percent, 30 percent, 40 percent, or 50 percent of a length dimension of the longitudinal filaments.

Example Ex51: An inductive heating assembly for conveying and inductively heating an aerosol-forming liquid, wherein the heating assembly comprises:

at least one liquid-conveying susceptor assembly according to any one of the preceding examples;

at least one induction source configured and arranged to generate an alternating magnetic field in a heating section of the at least one liquid-conveying susceptor assembly, in particular in a heating section of the non-grid portion.

Example Ex52: The heating assembly according to example Ex51, wherein the induction source comprises an induction coil arranged at least around the heating section of the liquid-conveying susceptor assembly, in particular at least around the heating section of the non-grid portion.

Example Ex53: The heating assembly according to any one of examples Ex51 or Ex52, wherein the heating section of the liquid-conveying susceptor assembly, in particular the heating section of the non-grid portion is located at a longitudinal end portion of the array of longitudinal filaments.

Example Ex54: The heating assembly according to any one of examples Ex51 to Ex53, wherein the heating section of the non-grid portion has a length of at least 5 percent, 10 percent, 20 percent, 30 percent, 40 percent, 50 percent, 60 percent, 70 percent, 80 percent of a length dimension of the non-grid portion along the length extension of the longitudinal filaments.

Example Ex55: The heating assembly according to any one of examples Ex51 to Ex54, wherein the heating section of the non-grid portion has a length of at most 10 percent, 20 percent, 30 percent, 40 percent, 50 percent, 60 percent, 70 percent, 80 percent, 90 percent or 100 percent of a length dimension of the non-grid portion along the length extension of the longitudinal filaments.

Example Ex56: The heating assembly according to any one of examples Ex51 to Ex55, wherein the susceptor assembly is arranged off-center with regard to a symmetry axis of the alternating magnetic field generated by the induction source in use of the heating assembly.

Example Ex57: An aerosol-generating article for use with an inductively heating aerosol-generating device, the article comprising:

at least one reservoir for storing aerosol-forming liquid, wherein the liquid reservoir comprises an outlet;

at least one liquid-conveying susceptor assembly according to any one of examples Ex1 to Ex50 for delivering aerosol-forming liquid from the liquid reservoir through the outlet into a region outside the liquid reservoir.

Example Ex58: The aerosol-generating article according to example Ex57, wherein the susceptor assembly comprises at least one soaking section arranged in the liquid reservoir.

Example Ex59: The aerosol-generating article according to any one of examples Ex57 or Ex58, wherein the soaking section of the susceptor assembly is located at a longitudinal end portion of the array of longitudinal filaments.

Example Ex60: The aerosol-generating article according to any one of examples Ex57 to Ex59, wherein the soaking section is part of the grid portion or wherein the grid portion is part of the soaking section.

Example Ex61: The aerosol-generating article according to example Ex60, wherein the soaking section of the grid portion has a length of at most 10 percent, at most 20 percent, at most 30 percent, at most 40 percent, at most 50 percent or at most 60 percent of a length dimension of the grid portion along the length extension of the longitudinal filaments.

Example Ex62: The aerosol-generating article according to any one of examples Ex60 or 61, wherein the at least one soaking section of the grid portion may have a length of at least 10 percent, at least 20 percent, at least 30 percent, at least 40 percent, at least 50 percent or at least 60 percent of the grid portion along the length extension of the longitudinal filaments.

Example Ex63: The aerosol-generating article according to any one of examples Ex57 to Ex62, further comprising an aerosol-forming liquid contained in the liquid reservoir.

Example Ex64: An aerosol-generating system comprising an inductively heating aerosol-generating device, an aerosol-generating article for use with the aerosol-generating device, and an inductive heating assembly according to any one of examples Ex51 to Ex56, wherein the induction source of the heating assembly is part of the inductively heating aerosol-generating device, and wherein the liquid-conveying susceptor assembly is part of the aerosol-generating article.

Examples will now be further described with reference to the figures in which:

FIG. 1 schematically illustrates an inductive heating assembly comprising a susceptor assembly according to a first embodiment of the present invention;

Figure 4:
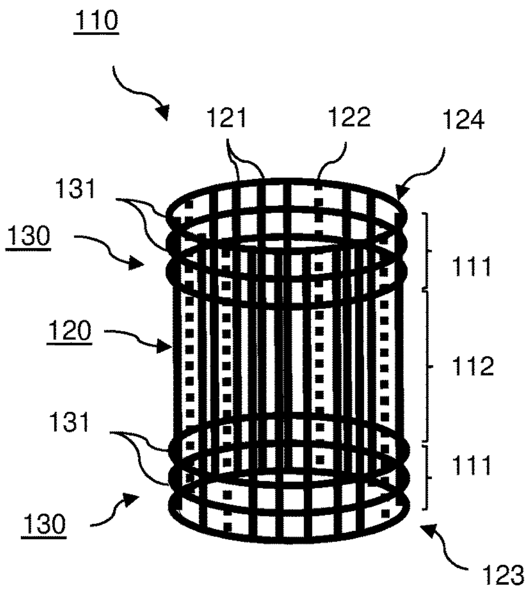
Figure 5:
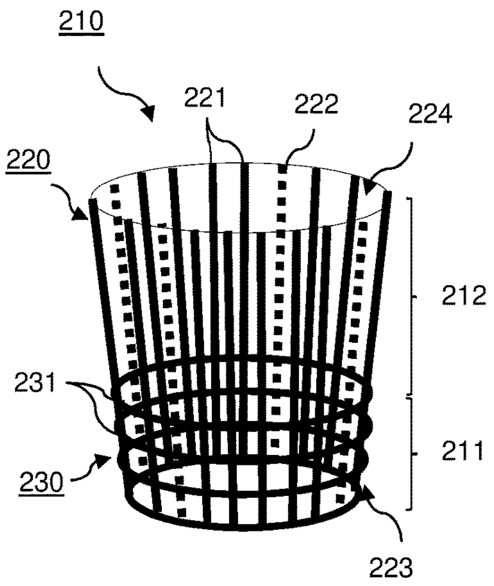
Figure 6:
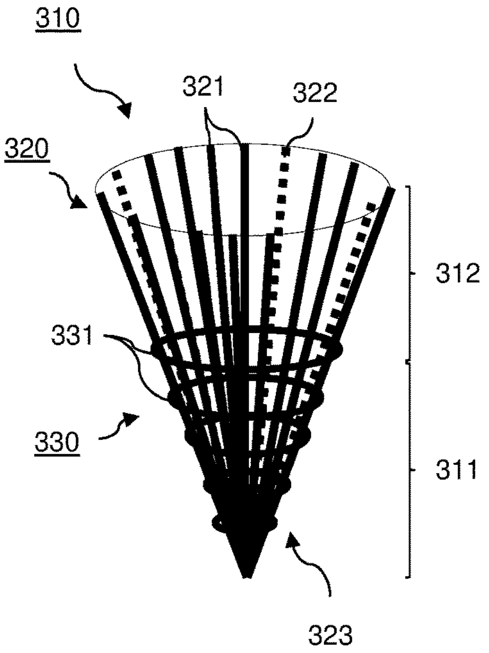
Figure 7:
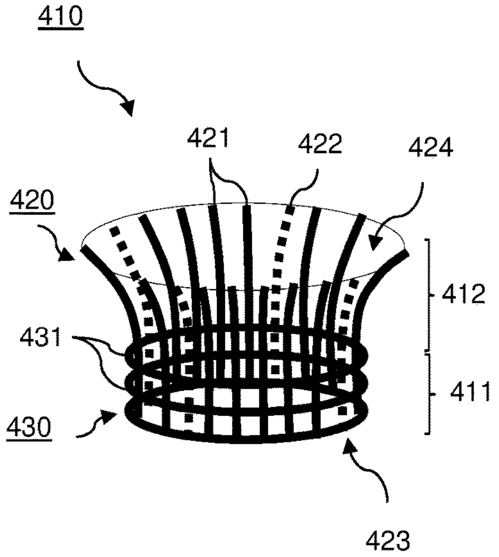
Figure 8:
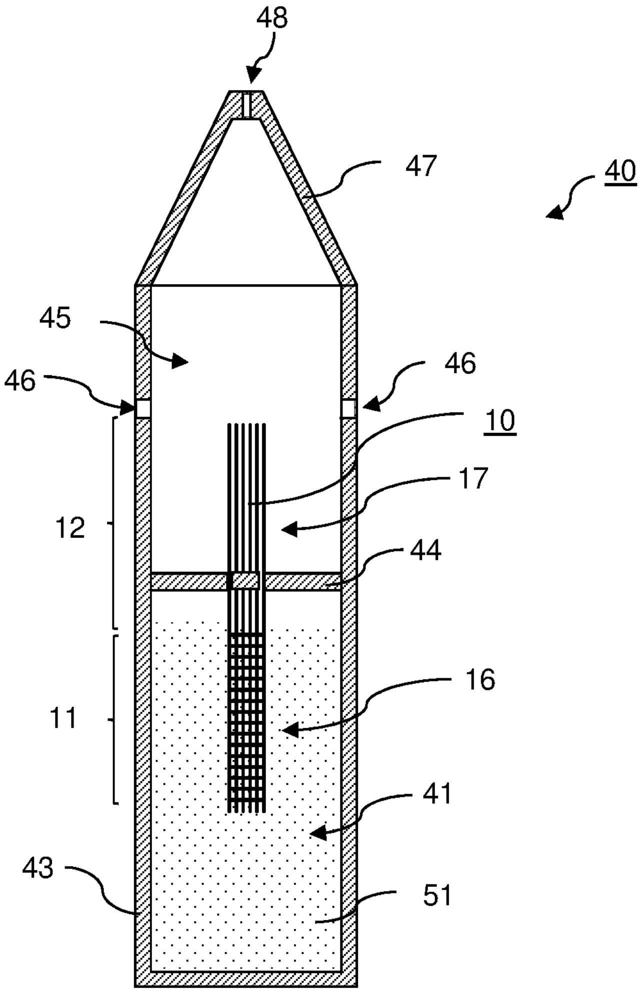
Figure 9:
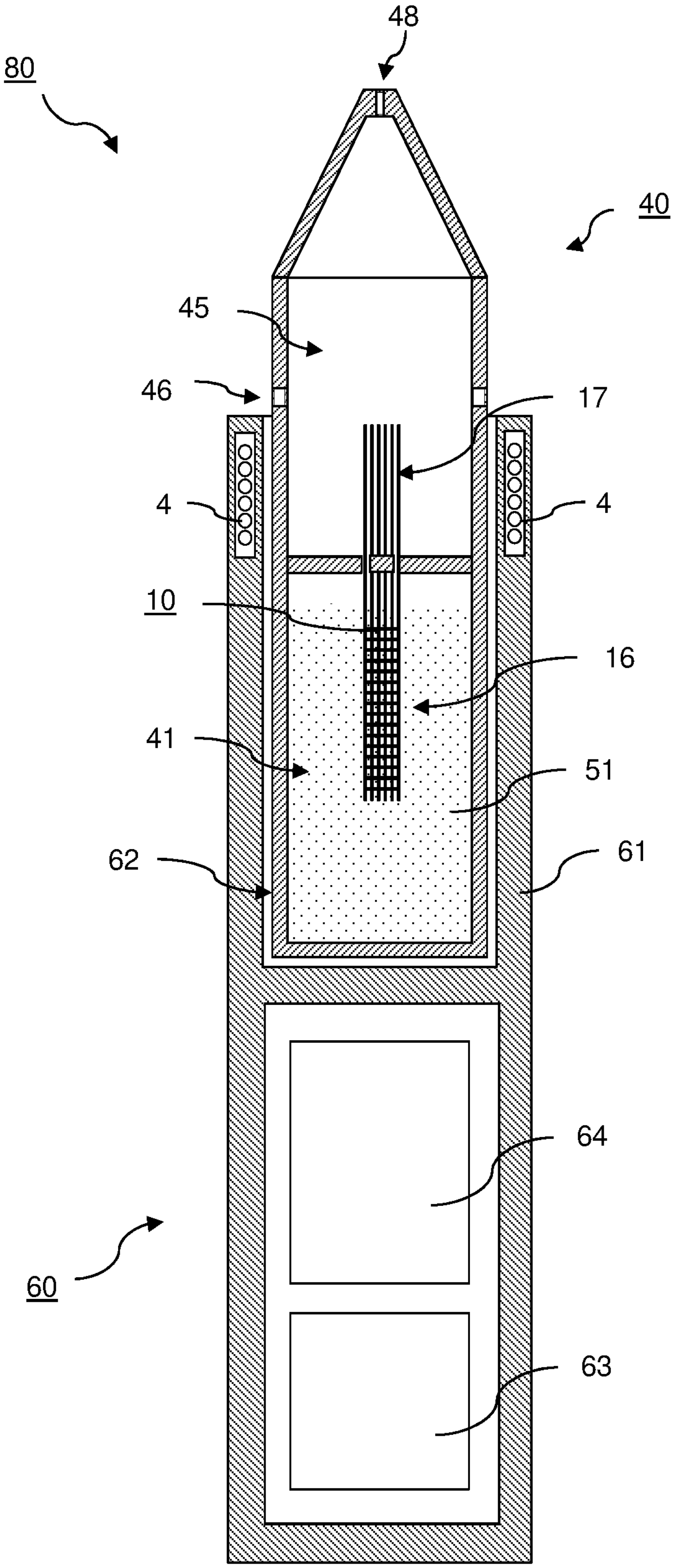

FIG. 4 schematically illustrates a susceptor assembly according to a second embodiment of the present invention;

FIG. 5 schematically illustrates a susceptor assembly according to a third embodiment of the present invention;

FIG. 6 schematically illustrates a susceptor assembly according to a fourth embodiment of the present invention;

FIG. 7 schematically illustrates a susceptor assembly according to a fifth embodiment of the present invention;

FIG. 8 schematically illustrates an exemplary embodiment of an aerosol-generating article according to the present invention; and FIG. 9 schematically illustrates an exemplary embodiment of an aerosol-generating system according to the present invention.

Figure 1:
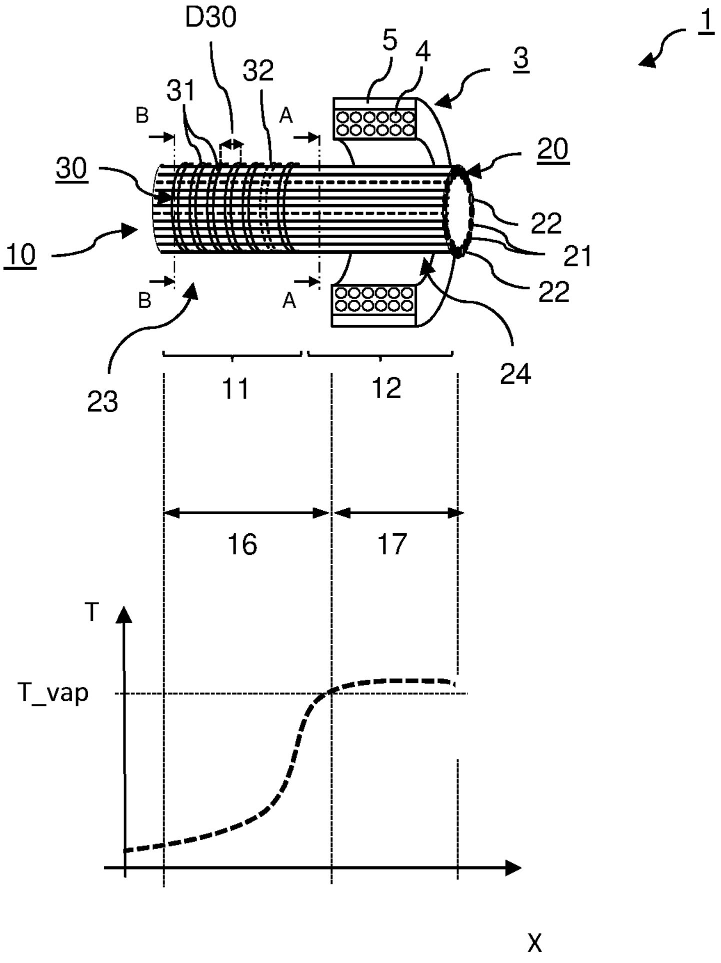

FIG. 1 schematically illustrates an inductive heating assembly 1 comprising a liquid-conveying susceptor assembly 10 according to a first embodiment of the present invention. In general, the susceptor assembly 10 comprises two filament arrays 20, 30 crossing each other only partially such that the susceptor assembly 10 comprises one grid portion 11, in which the two filament arrays 20, 30 cross each other, and a non-grid portion 12, in which the two filament arrays 20, 30 do not cross each other.

In the present embodiment, one of the two arrays 20, 30 is formed by an array 20 of inductively heatable longitudinal filaments 21, 22 which are arranged parallel to each other side by side in a hollow cylindrical configuration in which the longitudinal filaments 21, 22 extend substantially along the cylinder axis forming the wall of the hollow cylindrical configuration. The other array is formed by an array 30 of transverse filaments 31, 32 which are arranged side by side in the form of a plurality of circular rings circumferentially surrounding the hollow cylindrical configuration of the array 20 of longitudinal filaments 21, 22 such as to cross the array 20 of longitudinal filaments 21, 22, transverse to a length extension of the longitudinal filaments 21, 22. According to the invention, the array 30 of transverse filaments 31, 32 only extends along a length portion of the array 20 of longitudinal filaments 21, 22 such that the susceptor assembly 10 comprises a grid portion 11 and a non-portion 12, as described above.

The susceptor assembly 10 is capable to perform two functions: conveying and heating aerosol-forming liquid. For that purpose, the array 20 comprises a plurality of first filaments 21 and a plurality of second filaments 22, wherein the plurality of first filaments 21 comprise a first susceptor material and the plurality of second filaments 22 comprise a second susceptor material. Likewise, the array 30 comprises a plurality of first filaments 31 and a plurality of second filaments 32, wherein the plurality of first filaments 32 comprise the first susceptor material in the plurality of second filaments 32 comprises a second susceptor material. Preferably, the first and the second susceptor materials of the filaments 21, 22, 31, 32 of both arrays 20, 30 are identical. Due to the susceptive nature of the filament materials, the first filaments 21, 32 and the second filaments 22, 32 are capable to be inductively heated in an alternating magnetic field and thus to heat an aerosol-forming liquid in thermal contact with the filaments. Furthermore, due to the arrangement of the first and second filaments 21, 22, 31, 32 and the susceptor assembly 10 and due to the small diameter of the filaments 21, 22, 31, 32, narrow spaces are formed between the filaments 21, 22, 31, 32 which provide capillary action in both portions, in the grip portion 11 and the non-grid portion 12, in particular along the longitudinal direction X of the susceptor assembly 10. Thus, as an example, if one longitudinal end portion 23 of the array 20 of longitudinal filaments 21, 22 is immersed into an aerosol-forming liquid, liquid may be conveyed to the opposite longitudinal end portion 24 the array 20 of longitudinal filaments 21, 22, where the conveyed liquid may be vaporized and exposed to an air path to be drawn out as an aerosol.

For vaporizing the liquid, the heating assembly 1 further comprises an induction source 3 including an induction coil 4. In the present embodiment, the induction coil 4 is a double-layer helical coil, each layer having six windings, which is capable to generate a substantially homogeneous alternating magnetic field. As can be seen in FIG. 1, the induction coil 4 is arranged around the end portion 24 of the filament bundle 18 such as to generate an alternating magnetic field which locally penetrates the susceptor assembly at the longitudinal end portion 24 only. As a consequence, the susceptor assembly 10 is locally heated in a heating section 17 at the longitudinal end portion 24. Due the missing transverse filaments, the non-grid portion 11 only comprises those filaments 21, 22 whose geometry and orientation is optimized with regard to the orientation of the alternating magnetic field used for heating the susceptor assembly. In particular, the longitudinal filaments 21, 22 are arranged substantially parallel to the magnetic field penetrating the susceptor assembly 10 at the longitudinal end portion 24.

In contrast, the array 30 of transverse filaments 31, 32 primarily only serves to keep the array 20 of longitudinal filaments 21, 22 such as to provide a good filament bond as well as an improved mechanical and dimensional stability of the susceptor assembly 10.

The strength of the magnetic field is chosen such that heating section 17 is heated up to temperature sufficient to vaporize the aerosol-forming liquid conveyed through the susceptor assembly 10. In contrast, due to the only local heating, the remaining section 16 of the susceptor assembly 10, in particular the longitudinal end portion 23 stays at temperatures below the vaporization temperature. Hence, in use of the heating assembly 1, the susceptor assembly 10 comprises a temperature profile along its length direction X with sections of higher and lower temperatures as shown in the lower part of FIG. 1. More specifically, the temperature profile shows a temperature increase from the longitudinal end portion 23 to the heating section 17 at the opposite longitudinal end portion 24, from temperatures below a vaporization temperature T_vap of the aerosol-forming liquid to temperatures above the respective vaporization temperature T_vap. Advantageously, having the remaining section 16 below the vaporization temperature T_vap prevents boiling of aerosol-forming liquid within that part of the susceptor assembly 10. Even more, in case the remaining section 16 or at least a part of thereof is used as a soaking section 16 to be immersed into a liquid reservoir, boiling of aerosol-forming liquid within the reservoir is also prevented. As can be seen in FIG. 1, the heating section 17 is part of the non-grid portion 12, whereas the grid portion 12 is part of the remaining section 16 which may be used as soaking section 16.

The actual temperature profile forming up in use of the susceptor assembly 10 depends on the thermal conductivity and the length dimension of the array 20 of longitudinal filaments 21, 22. Accordingly, in order to have sufficient temperature gradient between the longitudinal end portion 23 and the longitudinal end portion 24, the longitudinal filaments 21, 22 require a certain total length. With regard to the present embodiment, the length dimension of the longitudinal filaments 21, 22 may be in a range between 5 millimeter and 50 millimeter, in particular between 10 millimeter and 40 millimeter, preferably between 10 millimeter and 30 millimeter, more preferably between 10 millimeter and 20 millimeter. This applies for each filament type, that is, the plurality of first filaments 21 and the plurality of second filaments 22.

Figure 2:
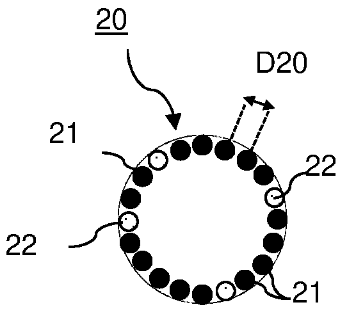
FIG. 2 shows a cross-section through the susceptor assembly according to FIG. 1 along line A-A.
Figure 3:
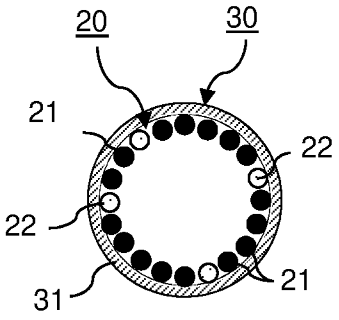
FIG. 3 shows a cross-section through the susceptor assembly according to FIG. 1 along line B-B.

FIG. 2 shows a cross-section through the susceptor assembly 10 along line A-A in FIG. 1, that is, through the non-grid portion 12. Likewise, FIG. 3 shows a cross-section through the susceptor assembly 10 along line B-B in FIG. 1, that is, through the grid portion 11. Both, the plurality of first filaments 21, 31 and the plurality of second filaments 22 of each array 20, 30 are solid material filaments having a substantially circular cross-section. Due to the specific filament arrangement, capillary spaces are formed between the pluralities of filaments 21, 22, 31, 32. Other cross-sectional shapes of the plurality of first and second filaments 21, 22, 31, 32 of are also possible, for example, oval, elliptical triangular rectangular, quadratic, hexagonal or polygonal cross-sections.

In order to provide a sufficient capillary action, the mean center-to-center distance D20 between adjacent longitudinal filaments 21, 22 may be in a range between 0.1 millimeter and 0.2 millimeter. Likewise, as indicated in FIG. 1, the mean center-to-center distance D30 between adjacent transverse filaments 31, 32 is at most 1 millimeter, preferably at most 0.5 millimeter.

The capillary action is promoted also by a small radius of curvature, and thus by a small diameter of the first and second filaments 21, 22, 31, 32. Accordingly, the first and second filaments 21, 22, 31, 32 may have a diameter of at most 0.025 millimeter, at most 0.05 millimeter, at most 0.1 millimeter, at most 0.15 millimeter, at most 0.2 millimeter, at most 0.25 millimeter, at most 0.3 millimeter, at most 0.35 millimeter, at most 0.4 millimeter, at most 0.45 millimeter or at most 0.5 millimeter. However, the diameter of the first and second filaments 21, 22, 31, 32 should be still larger than twice the skin depth in order to induce a sufficient amount of eddy currents and thus to generate a sufficient amount of heat energy when the susceptor assembly 10 is exposed to an alternating magnetic field. Accordingly, depending on the materials and the frequency of the alternating magnetic field used, the first and second filaments 11, 12 may have a diameter of at least 0.015 millimeter, at least 0.02 millimeter, at least 0.025 millimeter at least 0.05 millimeter, at least 0.075 millimeter, at least 0.1 millimeter, at least 0.125 millimeter, at least 0.15 millimeter, at least 0.2 millimeter, at least 0.3 millimeter or at least 0.4 millimeter.

In the present embodiment, the first and second filaments 21, 22, 31, 32 of both areas 20, 30 comprise a liquid-adhesive surface coating (not shown). The liquid adhesive surface coating further enhances capillary action of the susceptor assembly 10.

The first susceptor material of the plurality of first filaments 21, 31 is optimized with regard to heat generation. For example, the first susceptor material may be a ferromagnetic stainless steel causing the plurality of first filaments 21, 31 to be inductively heated by eddy currents as well as by hysteresis losses. The Curie temperature of the ferromagnetic first susceptor material is chosen such as to be above the vaporization temperature, preferably above 300 degree Celsius. In contrast, as described further above, the plurality of second filaments 22, 32 mainly serve as temperature markers. For that purpose, the second susceptor material may be a ferromagnetic or ferrimagnetic material which preferably has a Curie temperature at about a predefined operating temperature of the susceptor assembly 10. Accordingly, when the susceptor assembly 10 reaches the Curie temperature of the second susceptor material, the magnetic properties of the second susceptor material change from ferromagnetic or ferrimagnetic to paramagnetic, accompanied by a temporary change of its electrical resistance. Thus, by monitoring a corresponding change of the electrical current absorbed by the induction source 3 that is used to generate the alternating magnetic field it can be detected when the second susceptor material has reached its Curie temperature and, thus, when the predefined operating temperature has been reached. Suitable materials for the second susceptor material may be mu-metal or permalloy. To sufficiently work as temperature markers, only a few second filaments 22, 32 are required. Accordingly, the number of first filaments 21 may be larger, in particular two times or three times or four times or five times or six times or seven times or eight times or nine times or ten times larger than the number of second filaments 12. In the present embodiment, the array 20 of longitudinal filaments 21, 22 exemplarily comprises fifteen first filaments 21 and four second filaments 12. Likewise, the array 30 of transverse filaments 31, 32 exemplarily comprises six first filaments 31 and one second filament 32. However, since the grid portion 11 is not intended to be heated, the array 30 of transverse filaments does not necessarily need to comprise any second filaments 32. Even more, the array 30 of transverse filaments does not necessarily need to comprise any filaments being inductively heatable.

As can be also seen in FIG. 2, the plurality of second filaments 22 are randomly distributed throughout the array 20 of longitudinal filaments 21, 22. Advantageously, a random distribution requires only little effort during manufacturing of the susceptor assembly 10. As can be further seen in FIG. 2, the array 20 of longitudinal filaments 21, 22 has a substantially circular, in particular ring-shaped cross-section which is particularly easy to manufacture.

Again with reference to FIG. 1, the first and second filaments 21, 22 are arranged in parallel to each other such as to form a parallel-bundle portion along the entire length extension of the array 20 of longitudinal filaments 21, 22. That is, the array 20 of longitudinal filaments 21, 22 is an unstranded in which the first and second filaments 21, 22 are neither stranded nor twisted and, thus, do not cross each other. The parallel-bundling is particularly advantageous to provide sufficient capillary action along the entire length extension of the array 20 of longitudinal filaments 21, 22. Furthermore, such a susceptor assembly 10 is easy and cost-effective to manufacture.

FIG. 4 shows a second embodiment of the susceptor assembly 110 according to the present invention. In general, the susceptor assembly 110 according to FIG. 4 is similar to the susceptor assembly 10 shown in FIG. 1-3. Therefore, identical or similar features are denoted with the same reference signs, yet incremented by 100. In contrast to the first embodiment shown in FIG. 1-3, the array 130 of transverse filaments 131 of the susceptor assembly 110 according to FIG. 4 is divided into parts. This configuration results in a susceptor assembly comprising one non-grid portion 112 that is located between both longitudinal end portions 123, 124 of the array 120 of longitudinal filaments 121, 122, and two grid portions 111 at the longitudinal end portions of the array of longitudinal filaments 123, 124, one at each end. Advantageously, the two grid portions 111 at each longitudinal end portion 123, 124 may be used as soaking sections for conveying as a form liquid from two sides towards the non-grid portion 112 where the aerosol-forming liquid may be vaporized. Due to this, the liquid conveying capacity of the susceptor assembly 110 is increased. Further in contrast to the susceptor assembly 10 according to FIG. 1-3, the array 130 of transverse filaments 131 only comprises one type of filaments which necessarily do not need to be inductively heatable.

FIG. 5 shows a third embodiment of the susceptor assembly 210 according to the present invention. In general, the susceptor assembly 210 according to FIG. 5 is similar to the susceptor assembly 10 shown in FIG. 1-3. Therefore, identical or similar features are denoted with the same reference signs, yet incremented by 200. In contrast to the first embodiment shown in FIG. 1-3, the susceptor assembly 210 recorded FIG. 5 has a substantially frusto-conical shape, in particular a substantially hollow frusto-conical shape. In this configuration, the length axis of the frustoconical shape extends substantially along the length extension of the longitudinal filaments. However, the array 220 of longitudinal filaments 221, 222 forms the shell surface of the frustoconical shape.

FIG. 6 shows a fourth embodiment of the susceptor assembly 310 according to the present invention which is similar to the susceptor assembly 210 according to FIG. 5. Therefore, identical or similar features are denoted with the same reference signs, yet incremented by 100. In contrast to the third embodiment shown in FIG. 5, the susceptor assembly 310 according to FIG. 6 has a substantially conical shape, in particular hollow conical shape, in which the longitudinal filaments 321, 322 converge at one of the longitudinal end portion 323 of the array 320 of longitudinal filaments 321, 322.

With reference to both embodiments shown in FIG. 5 and FIG. 6, a conical or frusto-conical shape provides an inherent mechanical dimensional stability. Furthermore, the longitudinal filaments 321, 322, 421, 422 diverge from each other towards the base of the conical shape or frustoconical shape. Accordingly, a conical or frustoconical array of longitudinal filaments facilitates providing a fan-out portion at one longitudinal end portion 224, 324 of the array 320 of longitudinal filaments 321, 322.

FIG. 7 shows a fifth embodiment of the susceptor assembly 410 according to the present invention which is similar to the susceptor assembly 210 according to FIG. 5. Therefore, identical or similar features are denoted with the same reference signs, yet incremented by 200. In contrast to the third embodiment shown in FIG. 5, the susceptor assembly 310 according to FIG. 6 has a substantially cylindrical, in particular substantially hollow cylindrical shape along the grid portion 411 at the longitudinal end portion 423 of the array 420 of longitudinal filaments 421, 422. In contrast, in the grid portion 412, longitudinal filaments 421, 422 are curved such as to diverge from each towards the opposite longitudinal end portion 423 of the array 420 of longitudinal filaments 421, 422. As a result, like the susceptor assembly 220 shown in FIG. 5, the susceptor assembly 410 according to FIG. 7 also comprises a fan-out portion at the longitudinal end portion 424 of the array 420 of longitudinal filaments 421, 322. To this extent, the susceptor assembly 410 according to FIG. 7 may also considered as to have a frustoconical shape including a shell surface which is curved along the length extension of the longitudinal filaments 421, 422.

In any of these configurations shown in FIG. 4-7, the array of transverse filaments preferably has a substantially ring shape. That is, the transverse filaments extend along the circumference of the cylindrical, conically, or frustoconically (in particular hollow-cylindrical, hollow-conically or hollow-frustoconically) shaped array of longitudinal filaments in the grid portions 111, 211, 311, 411 of the susceptor assembly 110, 210, 310, 410.

FIG. 8 schematically illustrates an exemplary embodiment of an aerosol-generating article 40 according to the present invention. As will be described further below with regard to FIG. 9, the aerosol-generating article 40 is configured for use with an inductively heating aerosol-generating device. The article comprises 40 comprises a rigid article housing 43 made of a liquid impermeable material. Together with a bushing 44 the article housing 43 forms a liquid reservoir 41 which contains an aerosol-forming liquid 51. The bushing 44 comprises an ring-shaped opening forming an outlet of the liquid reservoir 41. The article 40 further comprises a liquid-conveying susceptor assembly 10 which substantially corresponds to the susceptor assembly 10 shown in FIG. 1-3. The hollow-cylindrical susceptor assembly 10 passes through the ring-shaped opening in the bushing 44 such as to be partially arranged in the liquid reservoir 41 and partly arranged in a vaporization cavity 45 which is formed by the article housing 43 and the bushing 44 adjacent to the liquid reservoir 41. Due to this, the susceptor assembly 10 is capable to deliver aerosol-forming liquid 51 from the liquid reservoir 41 through the outlet into a region outside the liquid reservoir 41, that is, into the vaporization cavity 45. There, the conveyed liquid 51 may be vaporized by inductively heating that part of the filament bundle 18 which is arranged in the vaporization cavity 45. Accordingly, that part of the filament bundle 18, which includes the grid-portion 11 and is arranged in the liquid reservoir 41 such as to be immersed into the aerosol-forming liquid 51, acts as a soaking section 16. The length of the soaking section 16 may be advantageously used to a control the amount of aerosol-forming liquid being soaked and conveyed from the liquid reservoir 41 into the vaporization cavity 45. In the present embodiment, the soaking section 16 has a length of about 60% of the total length of the filament bundle 18.

Likewise, that part of the susceptor assembly, which is part of the non-grid-portion 12 and is arranged in the vaporization cavity 45, acts at least partially as a heating section 17 when being exposed to an alternating magnetic field as described before with regard to FIG. 1.

As can be further seen in FIG. 8, the article 40 comprises air inlets 46 through the article housing 43 into the vaporization cavity 45 enabling air to enter into the vaporization cavity 45. The air inlet 46 may be configured to provide airflow at or around the heating section 16 of the susceptor assembly 10. The air inlet 46 may be a hole through the reservoir body. Likewise, the air inlet 46 may be a nozzle that is configured to direct airflow to a specific target location at the susceptor assembly 10. In addition, the article 41 comprises a mouthpiece 47 forming the proximal end portion of the vaporization cavity 45. The mouthpiece 47 has a tapered shape including an air outlet 48 at its very end, thus allowing a user to directly inhale an aerosol from the article. Preferably, the mouthpiece comprises a filter (not shown). Hence, when a user takes a puff, aerosol-forming liquid vaporized from the heating section 17 is exposed to the airflow having entered the vaporization cavity 45 through the air inlets 46 such as to form an aerosol which may be drawn out through the air outlet 48 in the mouthpiece 47.

In general, the aerosol-generating article 40 may be an aerosol-generating article for single use or an aerosol-generating article for multiple uses. In the latter case, the aerosol-generating article 40 may be refillable. That is, the liquid reservoir 41 may be refillable with aerosol-forming liquid 51 after depletion.

FIG. 9 schematically illustrates an exemplary embodiment of an aerosol-generating system 80 according to the present invention. The system 80 comprises an inductively heating aerosol-generating device 60 and an aerosol-generating article 40 for use with the device 60. In the present embodiment, the aerosol-generating article 40 corresponds to the article shown in FIG. 8. In particular, the article 40 comprises a susceptor assembly 10 for conveying and heating aerosol-forming liquid 51 contained in the article 40. The aerosol-generating device 60 is an electrically operated device that is capable of interacting with the article 40 in order to generate an aerosol by inductively heating the aerosol-forming liquid via the susceptor assembly 10. For this, the aerosol-generating device 60 comprises a receiving cavity 62 formed within the device housing 61 in a proximal portion of the device 60. The receiving cavity 62 is configured to removably receive at least a portion of the aerosol-generating article 40. For heating the susceptor assembly 10, the aerosol-generating device 60 comprises an induction source including an induction coil 4. In the present embodiment, the induction coil 4 is a single helical coil which is arranged and configured to generate a substantially homogeneous alternating magnetic field. As can be seen in FIG. 1, the induction coil 4 is arranged around the proximal end portion of the receiving cavity 62 such as to surround a portion of the non-grid portion of the susceptor assembly 10, when the aerosol-generating article 40 is received in the receiving cavity 62. In particular, the induction coil 4 is arranged such as to generate an alternating magnetic field that locally penetrates the susceptor assembly, in particular the non-grid portion only in the heating section 17. In contrast, due to the local heating, the soaking section 16 of the filament bundle 18 stays at temperatures below the vaporization temperature. Thus, boiling of aerosol-forming liquid 51 within the liquid reservoir 41 is prevented.

Together, the induction source of the aerosol-generating device 60 and the susceptor assembly 10 of the aerosol-generating article 44 form an inductive heating assembly according to the present invention.

The aerosol-generating device 60 further comprises a controller 64 for controlling operation of the aerosol-generating system 80, in particular for controlling the heating operation.

Furthermore, the aerosol-generating device 60 comprises a power supply 63 providing electrical power for generating the alternating magnetic field. Preferably, the power supply 63 is a battery such as a lithium iron phosphate battery. The power supply 63 may have a capacity that allows for the storage of enough energy for one or more user experiences.

Both, the controller 64 and the power supply 63 arranged in a distal portion of the aerosol-generating device 60.

For the purpose of the present description and of the appended claims, except where otherwise indicated, all numbers expressing amounts, quantities, percentages, and so forth, are to be understood as being modified in all instances by the term “about”. Also, all ranges include the maximum and minimum points disclosed and include any intermediate ranges therein, which may or may not be specifically enumerated herein. In this context, therefore, a number A is understood as A±5 percent of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The invention claimed is:

1. A liquid-conveying susceptor assembly for conveying and inductively heating an aerosol-forming liquid under an influence of an alternating magnetic field, the liquid-conveying susceptor assembly comprising:

an array of inductively heatable longitudinal filaments arranged side by side; and an array of transverse filaments arranged side by side and crossing the array of inductively heatable longitudinal filaments transverse to a length extension of the inductively heatable longitudinal filaments, wherein the array of transverse filaments only extends along a length portion of the array of inductively heatable longitudinal filaments such that the liquid-conveying susceptor assembly further comprises at least one grid portion and at least one non-grid portion, wherein in the grid portion the array of transverse filaments and the array of inductively heatable longitudinal filaments cross each other, wherein in the non-grid portion the liquid-conveying susceptor assembly only comprises the inductively heatable longitudinal filaments, but no transverse filaments, wherein a length dimension of the at least one non-grid portion along the length extension of the inductively heatable longitudinal filaments is at least 20 percent of a length dimension of the inductively heatable longitudinal filaments, and wherein at least part of the non-grid portion is configured to be a heating section of the susceptor assembly to be exposed to an alternating magnetic field in order to vaporize the aerosol-forming liquid.

2. The liquid-conveying susceptor assembly according to claim 1, wherein the at least one grid portion is located at one of two longitudinal end portions of the array of inductively heatable longitudinal filaments, or wherein the at least one grid portion is located between both of the two longitudinal end portions of the array of inductively heatable longitudinal filaments.

3. The liquid-conveying susceptor assembly according to claim 1, wherein the at least one non-grid portion is located at a longitudinal end portion of the array of inductively heatable longitudinal filaments, or wherein the at least one non-grid portion is located between both of two longitudinal end portions of the array of inductively heatable longitudinal filaments.

4. The liquid-conveying susceptor assembly according to claim 1, wherein a length dimension of the non-grid portion along the length extension of the inductively heatable longitudinal filaments is at least 30 percent of a length dimension of the inductively heatable longitudinal filaments.

5. The liquid-conveying susceptor assembly according to claim 1, wherein a length dimension of the non-grid portion along the length extension of the inductively heatable longitudinal filaments is at least 80 percent of a length dimension of the inductively heatable longitudinal filaments.

6. The liquid-conveying susceptor assembly according to claim 1, wherein a length dimension of the grid portion along the length extension of the inductively heatable longitudinal filaments is at most 90 percent of a length dimension of the inductively heatable longitudinal filaments.

7. The liquid-conveying susceptor assembly according to claim 1, wherein a length dimension of the grid portion along the length extension of the inductively heatable longitudinal filaments is at most 20 percent of a length dimension of the inductively heatable longitudinal filaments.

8. The liquid-conveying susceptor assembly according to claim 1, wherein the array of inductively heatable longitudinal filaments has a substantially cylindrical shape or a substantially hollow cylindrical shape or a substantially conical shape or a substantially frusto-conical shape or a substantially hollow conical shape or a substantially hollow frusto-conical shape.

9. The liquid-conveying susceptor assembly according to claim 1, wherein the array of transverse filaments has a substantially ring shape.

10. The liquid-conveying susceptor assembly according to claim 1, wherein a mean center-to-center distance between adjacent inductively heatable longitudinal filaments is in a range between 0.1 millimeter and 2 millimeters.

11. The liquid-conveying susceptor assembly according to claim 1, wherein a mean center-to-center distance between adjacent inductively heatable longitudinal filaments is in a range between 0.025 millimeter and 0.5 millimeter.

12. The liquid-conveying susceptor assembly according to claim 1, wherein at least one of the inductively heatable longitudinal filaments and the transverse filaments comprise one or more first filaments including a first susceptor material, and a plurality of second filaments including a second susceptor material, and wherein the second susceptor material comprises one of a ferrimagnetic material or a ferromagnetic material.

13. The liquid-conveying susceptor assembly according to claim 1, further comprising a fan-out portion at at least one longitudinal end portion of the array of the inductively heatable longitudinal filaments, wherein the inductively heatable longitudinal filaments diverge from each other.

14. An inductive heating assembly for conveying and inductively heating an aerosol-forming liquid, the inductive heating assembly comprising:

at least one liquid-conveying susceptor assembly according to claim 1; and at least one induction source configured and arranged to generate an alternating magnetic field in a heating section of the at least one liquid-conveying susceptor assembly.

15. The inductive heating assembly according to claim 14, wherein the at least one induction source is further configured and arranged to generate the alternating magnetic field in a heating section of the non-grid portion.

16. The inductive heating assembly according to claim 15, wherein the heating section of the non-grid portion has a length of at least 5 percent of a length dimension of the non-grid portion along the length extension of the inductively heatable longitudinal filaments.

17. The inductive heating assembly according to claim 15, wherein the heating section of the non-grid portion has a length of at least 80 percent of a length dimension of the non-grid portion along the length extension of the inductively heatable longitudinal filaments.

18. An aerosol-generating article for an inductively heatable aerosol-generating device, the aerosol-generating article comprising:

at least one reservoir comprising an outlet and being configured to store aerosol-forming liquid; and at least one liquid-conveying susceptor assembly according to claim 16 and being configured to deliver the aerosol-forming liquid from the at least one reservoir through the outlet into a region outside the at least one reservoir.

19. The aerosol-generating article according to claim 18, wherein the at least one liquid-conveying susceptor assembly comprises at least one soaking section arranged in the at least one reservoir, and wherein the at least one soaking section is part of the grid portion or wherein the grid portion is part of the at least one soaking section.

20. An aerosol-generating system, comprising:

an inductively heatable aerosol-generating device;

an aerosol-generating article for the aerosol-generating device; and an inductive heating assembly according to claim 14, wherein the at least one induction source of the inductive heating assembly is part of the inductively heatable aerosol-generating device, and wherein the at least one liquid-conveying susceptor assembly of the inductive heating assembly is part of the aerosol-generating article.

* * * * *